United States Patent
Baek et al.

(10) Patent No.: US 9,716,865 B2
(45) Date of Patent: Jul. 25, 2017

(54) APPARATUS AND METHOD FOR SHOOTING MOVING PICTURE IN CAMERA DEVICE

(71) Applicant: Samsung Electronics Co., Ltd, Gyeonggi-do (KR)

(72) Inventors: Woohyun Baek, Gyeonggi-do (KR); Sungkoo Lee, Gyeonggi-do (KR); Sungwook An, Seoul (KR); Hyunho Park, Seoul (KR)

(73) Assignee: SAMSUNG ELECTRONICS CO., LTD, Suwon-si, Gyeonggi-Do (KR)

(*) Notice: Subject to any disclaimer, the term of this patent is extended or adjusted under 35 U.S.C. 154(b) by 643 days.

(21) Appl. No.: 13/769,139

(22) Filed: Feb. 15, 2013

(65) Prior Publication Data

US 2013/0215291 A1   Aug. 22, 2013

(30) Foreign Application Priority Data

Feb. 16, 2012 (KR) .................. 10-2012-0016085

(51) Int. Cl.
*H04N 7/12* (2006.01)
*H04N 5/76* (2006.01)
*H04N 19/51* (2014.01)
*H04N 19/139* (2014.01)
*H04N 19/172* (2014.01)
(Continued)

(52) U.S. Cl.
CPC ....... *H04N 7/26867* (2013.01); *H04N 19/107* (2014.11); *H04N 19/139* (2014.11); *H04N 19/172* (2014.11); *H04N 19/426* (2014.11); *H04N 19/51* (2014.11); *H04N 19/517* (2014.11)

(58) Field of Classification Search
CPC ............ H04N 7/26867; H04N 19/172; H04N 19/107; H04N 19/51; H04N 19/139; H04N 19/517; H04N 19/426
See application file for complete search history.

(56) References Cited

U.S. PATENT DOCUMENTS 5,287,420 A    2/1994 Barrett
2003/0007781 A1*  1/2003 Boon ................... G11B 27/105
                                          386/329
(Continued)

FOREIGN PATENT DOCUMENTS

EP         1303129 A1    4/2003
EP         1538821 A1    6/2005
(Continued)

OTHER PUBLICATIONS

Extended European Search Report dated Jun. 3, 2013 in connection with European Patent Application No. 13155155.8, 12 pages.

*Primary Examiner* — Tsion B Owens

(57) ABSTRACT

A method of shooting a moving picture in a camera device includes acquiring a frame image for each frame from a camera upon shooting a moving picture. The method also includes dividing and generating the acquired image to a display image and a compression image to transmit one frame, and configuring the compression image as a motion vector of a frame corresponding to a reference frame image or a compression image of a reference frame image. The method further includes displaying the display image and restoring and compressing the compression image to a moving picture, and storing the compressed moving picture.

10 Claims, 9 Drawing Sheets

(51) Int. Cl.
*H04N 19/107* (2014.01)
*H04N 19/426* (2014.01)
*H04N 19/517* (2014.01)

(56) References Cited

U.S. PATENT DOCUMENTS

| | | | |
|---|---|---|---|
| 2005/0105810 A1 | 5/2005 | Kim | |
| 2007/0052847 A1* | 3/2007 | Yamada | H04N 5/4401 348/468 |
| 2008/0136940 A1 | 6/2008 | Srikanth et al. | |
| 2010/0118963 A1* | 5/2010 | Nakagami | G06T 3/40 375/240.16 |
| 2010/0265525 A1* | 10/2010 | Hagiwara | H04N 1/41 358/1.9 |
| 2011/0261228 A1* | 10/2011 | Peng | H04N 1/2145 348/231.6 |
| 2012/0062767 A1* | 3/2012 | Satomi | H04N 9/7921 348/231.99 |

FOREIGN PATENT DOCUMENTS

| | | | |
|---|---|---|---|
| EP | 1575278 A1 | | 9/2005 |
| EP | 2129105 A1 | | 12/2009 |
| JP | 4561475 B2 | | 10/2010 |
| JP | 2013135463 A | * | 7/2013 |

\* cited by examiner

APPARATUS AND METHOD FOR SHOOTING MOVING PICTURE IN CAMERA DEVICE

CROSS-REFERENCE TO RELATED APPLICATION(S) AND CLAIM OF PRIORITY

The present application is related to and claims the benefit under 35 U.S.C. §119(a) of a Korean patent application filed on Feb. 16, 2012 in the Korean Intellectual Property Office and assigned Serial No. 10-2012-0016085, the entire disclosure of which is hereby incorporated by reference.

TECHNICAL FIELD OF THE INVENTION

The present disclosure relates to a shooting apparatus and method of a camera, and more particularly, to an apparatus capable of shooting a full high definition (HD) resolution image of a camera device as a moving picture.

BACKGROUND OF THE INVENTION

A camera device and a portable terminal apparatus including a camera may provide a high quality image and various user convenience functions. An image sensor (which may be referred to as 'camera sensor') may detect images having full HD resolution or greater.

In some situations, the camera device displays an image detected from the camera sensor as a preview image in a preview mode. If the user presses a shutter button, the camera device stores an image acquired from the camera sensor. If the user presses the shutter button (shutter release), there may be a shutter delay or shutter lag until capture. That is, there is a time difference between when the user presses the shutter button and when the camera sensor shoots a subject. Such a time difference may occur due to a shooting environment of the subject and a processing time of an image processor. Accordingly, there is a problem in that the user cannot acquire an image of a desired time point due to shutter delay (shutter lag).

The camera device or a terminal apparatus including the camera device may include an image processor for processing an image of a camera and an application processor for processing various applications of a device including a camera application. In some situations, the image processor and the application processor are serially connected to each other. The image processor converts the image acquired from the camera into serial data and transmits the serial data to the application processor. The image acquire from the camera may include an image having HD resolution or greater (Ultra HD (UHD) resolution). The image of UHD resolution refers to an image having 4K*2K resolution or greater.

Accordingly, the camera device having the image processor and the application processor or a terminal apparatus having the camera device have a difficulty in shooting the image of the UHD resolution as a moving picture. That is because it may be difficult or impossible for an image processor in a current camera device to transmit image data of UHD resolution of a continuous moving picture to the application processor at a desired time.

SUMMARY OF THE INVENTION

To address the above-discussed deficiencies of the prior art, it is a primary object to provide an apparatus for capturing images shot from a camera device or a terminal apparatus including a camera and for selecting and storing a desired image from the shot images, and a method thereof. To do this, the camera device or the terminal apparatus including the camera according the embodiment of the present disclosure suggest an apparatus and a method which process images acquired from camera sensors to generate a plurality of images for each frame, and use the generated images as a preview image and a capture image.

The present disclosure further provides an apparatus and a method capable of images of UHD resolution as a moving image in the camera device or a terminal apparatus including a camera. To do this, the embodiment of the present disclosure suggests an apparatus and a method which compare an image of UHD resolution acquired from a camera by an image process with an image of the UHD resolution of an adjacent frame to compression-code and transmit the comparison result, and restores the compression-coded images by an application processor to code them as a moving image.

In accordance with an aspect of the present disclosure, a method includes acquiring a frame image for each frame from a camera upon shooting a moving picture. The method also includes dividing and generating the acquired image into a display image and a compression image to transmit one frame, and configuring the compression image as a motion vector of a frame corresponding to a reference frame image or a compression image of a reference frame image. The method further includes displaying the display image and restoring and compressing the compression image to a moving picture, and storing the compressed moving picture.

In accordance with another aspect of the present disclosure, a camera device includes a camera. The camera device also include an image processor configured to acquire a frame image for each frame from the camera upon shooting a moving picture, divide the acquired image into a display image and a compression image to transmit one frame, and configure the compression image as a motion vector of a frame corresponding to a reference frame image or a compression image of a reference frame image. The camera device further includes an application processor configured to display the display image, and restore and compress the compression image to a moving picture; a memory configured to store the compressed moving picture; and a display unit configured to display the display image.

In accordance with still another aspect of the present disclosure, a portable terminal apparatus includes a communication unit configured to perform wireless communication with an external device, and a terminal controller configured to control a call and communication of the portable terminal apparatus through the communication unit. The portable terminal also includes a camera configured to acquire an image from a camera sensor for each frame upon drive of the camera, and an image processor configured to acquire a frame image for each frame from the camera upon shooting a moving picture, divide the acquired image into a display image and a compression image to transmit one frame, and configure the compression image as a motion vector of a frame corresponding to a compression image of a reference frame image or a reference frame image. The portable terminal further includes an application processor configured to display the display image and restore and compress the compression image to a moving picture, a memory configured to store the compressed moving picture, and a display unit configured to display the display image.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
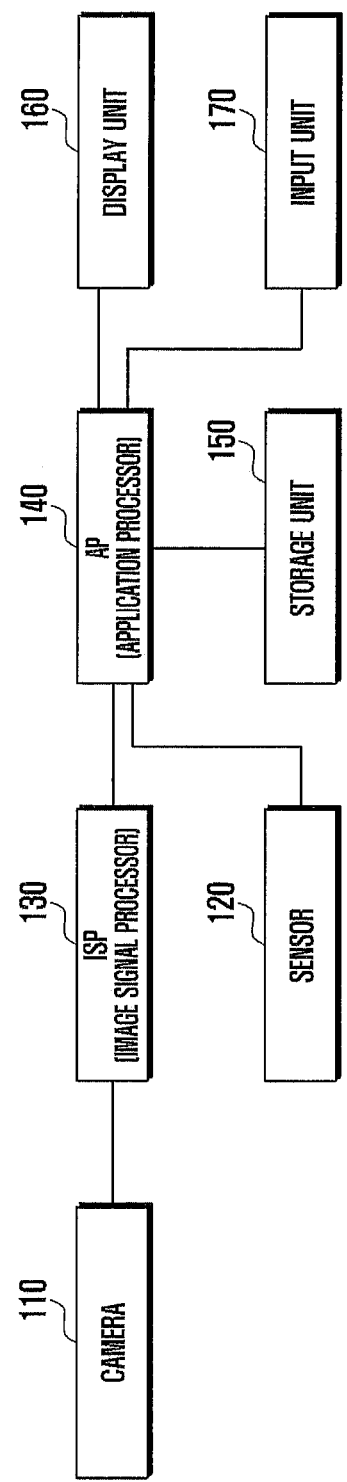
FIG. 1 is a block diagram illustrating a configuration of a camera device according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure are described with reference to the accompanying drawings in detail. The same reference numbers are used throughout the drawings to refer to the same or like parts.

The following description illustrates concrete specific information such as the pixel number of an image or the size of data. Detailed descriptions of well-known functions and structures incorporated herein may be omitted to avoid obscuring the subject matter of the present disclosure.

The present disclosure relates to a camera device or a terminal apparatus including a camera, which processes images acquired from a camera sensor to generate a plurality of images for each frame. The generated image may include an image for preview and a compression image for storage upon a storage drive of a camera.

The display image may include a YUV image, and may be controlled to a suitable size (crop and/or scaling) to be displayed on a display unit. The compression image for storage is an image (e.g., image of full HD resolution or greater (UHD resolution)) acquired from the camera sensor, which is a compression-coded image. The compression image for storage will be described as a JPEG image in the following embodiments. Embodiments of the present disclosure may include an apparatus and a method capable of implementing zero shutter-lag by generating and buffering a preview image and an image for capture upon a storage drive of a camera, and selecting and storing a compression image by a user or a preset scheme.

The camera device or the terminal apparatus including a camera according to the embodiment of the present disclosure processes an image for each frame acquired from a camera sensor upon a storage drive of the camera (e.g., preview mode) to generate a preview image and a capture image.

When the user operates the camera, the camera device acquires images for each frame period from the camera sensor, converts the acquired images into a display image and a compression image, displays the display image on the display unit, and buffers the compression image. The display image may be a YUV image and the compression image may be a JPEG of full HD resolution.

If capture of the still image is requested from the user, the camera device may select and store a JPEG image when the capture is requested from the buffered JPEG images, display a thumbnail image, or store a JPEG image corresponding to the selected thumbnail image.

The camera device or the terminal apparatus including a camera according to embodiments of the present disclosure includes an image processor and an application processor, and shoots images of UHD resolution as a moving picture. To do this, the image processor acquires an image of UHD resolution for each frame, and converts the acquired image into a display image and a compression image. Next, the image processor stores every N-th frame image as a reference image and generates and outputs the N-th frame image as a compression image to the application processor. The image processor compares remaining images other than every N-th frame with the reference image to detect a motion component (hereinafter referred to as 'motion vector'). If the motion vector is less than the preset reference value, the image processor compression-codes the motion vector to output an image of a corresponding frame to the application processor.

If the motion vector is equal to or greater than the preset reference value, the image processor compression-codes and outputs the image of the corresponding frame to the application processor.

The application processor buffers received compression images and restores and stores a compression image of every N-th frame as a reference image. The application processor analyzes compression images of remaining frames other than every N-th frame. If the compression images of the remaining frames are motion compression data, the application processor restores the motion compression data and merges the motion compression with the reference image. If the compression images of the remaining frames are still image compression data, the application processor restores the still image compression data. Further, the application processor compresses and stores the restored frame images as a moving picture.

The display image may be a YUV image, and the compression image may be a JEPG of full HD resolution or greater. The compression of the motion vector may use run length coding (hereinafter referred to 'RLC'). The run length may be the same length of continuous pixels.

Hereinafter, the present disclosure will be described in detail with reference to the accompanying drawings. A camera device will be described by way of example in a following description.

FIG. 1 is a block diagram illustrating a configuration of a camera device according to an embodiment of the present disclosure.

Referring to FIG. 1, a camera 110 includes an image sensor. A camera 110 performs a function of acquiring an image by an image sensor upon operation of the camera. The acquired image may be an image of UHD resolution. The sensor 120 may include at least one sensor mounted in the camera device or a terminal apparatus including a camera, which may include at least one of GPS receiver, a gyro sensor, an acceleration sensor, an altitude sensor, and a direction sensor.

An image processor 130 processes an image acquired from the camera 110 to generate a display image to be displayed on a display unit 160 and a compression image to be stored upon capture request (capture of a still image or a moving picture). The display image may include a YUV image. The image processor 130 color-converts the image acquired from the camera 110 and controls the size of the image to a size for being displayed on the display unit 160 (scaling and/or crop). That is, the image processor 130 generates a YUV image, and may suitably set the YUV image according to display ability of the display unit 160. In an embodiment, the YUV image may have a different data size than the size of the compression image. The image processor 130 compresses the image output from the camera 110 in a JPEG scheme. The compression image may be an image to be stored when the user requests capture, and may be an image of UHD resolution greater than full HD resolution.

The image processor 130 generates an image of every N-th frame as a JPEG image, and stores the JPEG image as a reference image. The image processor 130 compares images of remaining frames with a reference image to estimate a motion vector. If the estimated motion vector is less than a specific size, the image processor 130 RLC-codes the images of remaining frames and outputs the RLC-coded images as a compression image of a corresponding frame. If the estimated motion vector is greater than the specific size, the image processor 130 compresses a corresponding frame image to a JPEG image and output the JPEG image. In general, in a case of a moving picture, a motion vector is not significantly changed in an image between adjacent frames. Accordingly, the image processor 130 transmits a JPEG image being a compression image of UHD resolution at a predetermined frame interval, estimates a motion vector having a difference between images of remaining frames and the reference image, and outputs the estimated vector as a compression image of a corresponding frame. Accordingly, when transmitting the compression image to the application processor 140, because a compression image of remaining frames except for every N-th frame transmits only the motion vector, a transmission amount of the compression image may be significantly reduced. The reason to transmit a corresponding frame image as a JPEG image when the motion vector is equal to or greater than the specific size is that a transmission amount of the corresponding frame image to be transmitted is large; efficiency of transmitting the corresponding frame is not higher than efficiency of transmitting the JPEG image because the application processor 140 restores the corresponding frame image and again performs a procedure of merging the corresponding frame image with the reference image.

The application processor 140 buffers a display image and a compression image generated from the image processor 130 upon operation of the camera, and controls the display unit 160 to output the display image. If the user generates a still image capture request, the application processor 140 stores a preset compression image of the buffered compression images to implement zero shutter-lag.

The application processor 140 analyzes a compression image buffered upon shooting a moving picture, and generates and stores the compression image as the moving picture. If the compression image is a compression image of every N-th frame, the application processor 140 restores the compression image as a still image (YUV image of UHD) and stores the sill image as the reference image. Because the compression images of remaining frames are data obtained by compressing the motion vector, the application processor 140 restores the compressed motion vector and merges the compressed motion vector with the reference image to restore a still image of UHD. The application processor 140 compression-codes the foregoing restored images of UHD to a moving picture in an order of frames and stores the moving picture in the storage unit 150.

The input unit 170 may generate and provide a camera operation command and a capture command (capture of still image, capture of moving picture, and the like) to the application processor 140. The display unit 160 displays a display image output from the application processor 140 in a preview mode. The input unit 170 may be a touch panel for detecting a touch input of the user, and the display unit 160 may be an LCD or an OLED displaying data and images generated during execution of a program. The input unit 170 and the display unit 160 may be an integral touch screen. The input unit 170 may include buttons located outside the camera device.

The storage unit 150 stores the compression image buffered in the application processor 140 as a still image or a moving picture.

Figure 2:
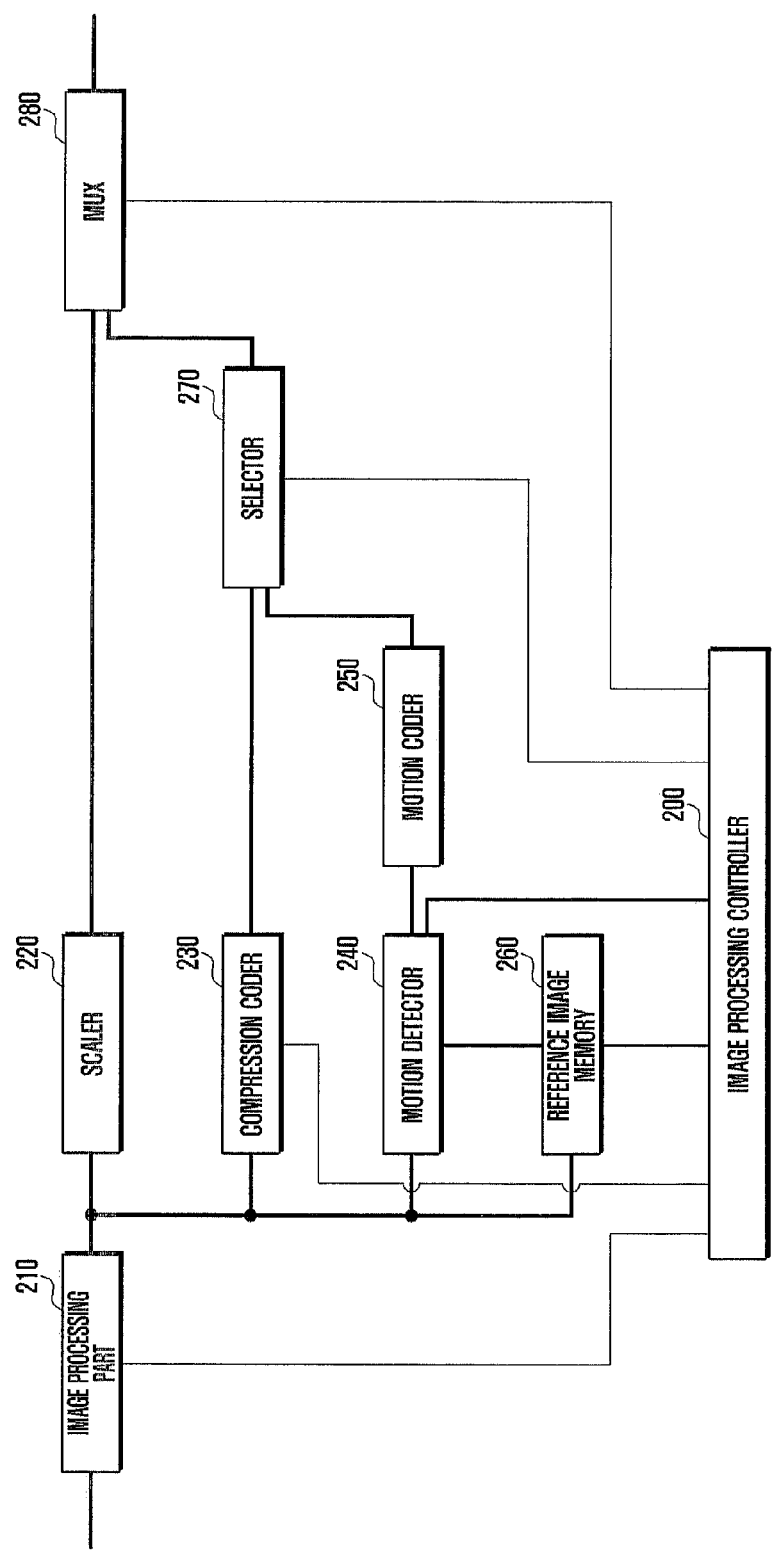
FIG. 2 is a block diagram illustrating a configuration of an image processor according to an embodiment of the present disclosure.

FIG. 2 is a block diagram illustrating a configuration of an image processor 130 according to an embodiment of the present disclosure.

Referring to FIG. 2, an image preprocessor 210 of the image processor 130 converts the image output from the camera 110 into a YUV image.

The image output from the camera 110 is a raw image, and has the number of pixels greater than full HD resolution detected by the image sensor 120. The image preprocessor 210 performs an image preprocessing function such as preprocessing 3A, color interpolation, and color conversion. The preprocessing 3A may include auto white balance (AWB), auto exposure (AE), and auto focusing (AF), and color conversion may be a function of converting a raw image into YUV data. The image preprocessor 210 may perform all or a part of the foregoing functions. The image processing controller 200 controls an operation of the camera 100 under the control of the application processor 140, and controls an overall operation of the image processor 130 in a camera operation mode. The compression image, the display image, and/or the shot information are generated for each frame, and the frame may be configured by 30 frames for one second or greater (e.g., 60 frames).

A scaler 220 scales an image output from the image preprocessor 210 to an image of a suitable size which may be displayed on the display unit 160. The scaler 220 may include constituent elements or a part thereof for scaling, cropping, and/or the image data. When the image preprocessor 210 does not perform a color conversion function, the scaler 220 may be configured by a display image generator. The display image generator may be configured by a color converter for converting a raw image into a YUV image and a scaler.

A compression coder 230 generates a compression image to be stored upon capture, which is a still image compressor, and may use various coders (e.g., JPEG coder, TIFF coder, and the like). It is assumed in one embodiment of the present disclosure that the still image compressor 230 is a JPEG coder 230. The JPEG coder 230 compresses an image output from the image preprocessor 210 to a JPEG image. A reference image memory 260 stores an image of UHD for every N-th frame as a reference image under the control of the image processing controller 200. The stored reference image may be an image of UHD in a YUV scheme. The motion detector 240 compares images of UHD of remaining frames except for every N-th frame with the reference image to detect a motion vector under the control of the image processing controller 200, and outputs the detected motion vector to the image processing controller 200. A motion coder 250 compression-codes a motion vector output from the motion detector 240 to output the compression-coded motion vector. In this case, a compression coding scheme may include a RLC scheme. A selector 270 selects and outputs the output of the compression coder 230 or the motion coder 250 according to an output selection signal of the image processing controller 200. If the motion vector is equal to or greater than a specific size, the image processing controller 200 generates an output selection signal of the compression coder 230. If the motion vector is less than the specific size, the image processing controller 200 generates an output selection signal of the motion coder 250. The motion detector 240 includes reference data for determining whether the detected motion vector is equal to or greater than the specific size and detects the motion vector. The motion detector 240 may compare the detected motion vector with the reference data to generate a size determination signal. In an embodiment, the image processing controller 200 may generate the output selection signal of the compression coder 240 or the compression coder 230 according to the size determination signal.

A multiplexer 280 multiplexes the compression and the display image to one frame and transmits the one frame to the application processor 140 under the control of the image processing controller 200.

Figure 3:
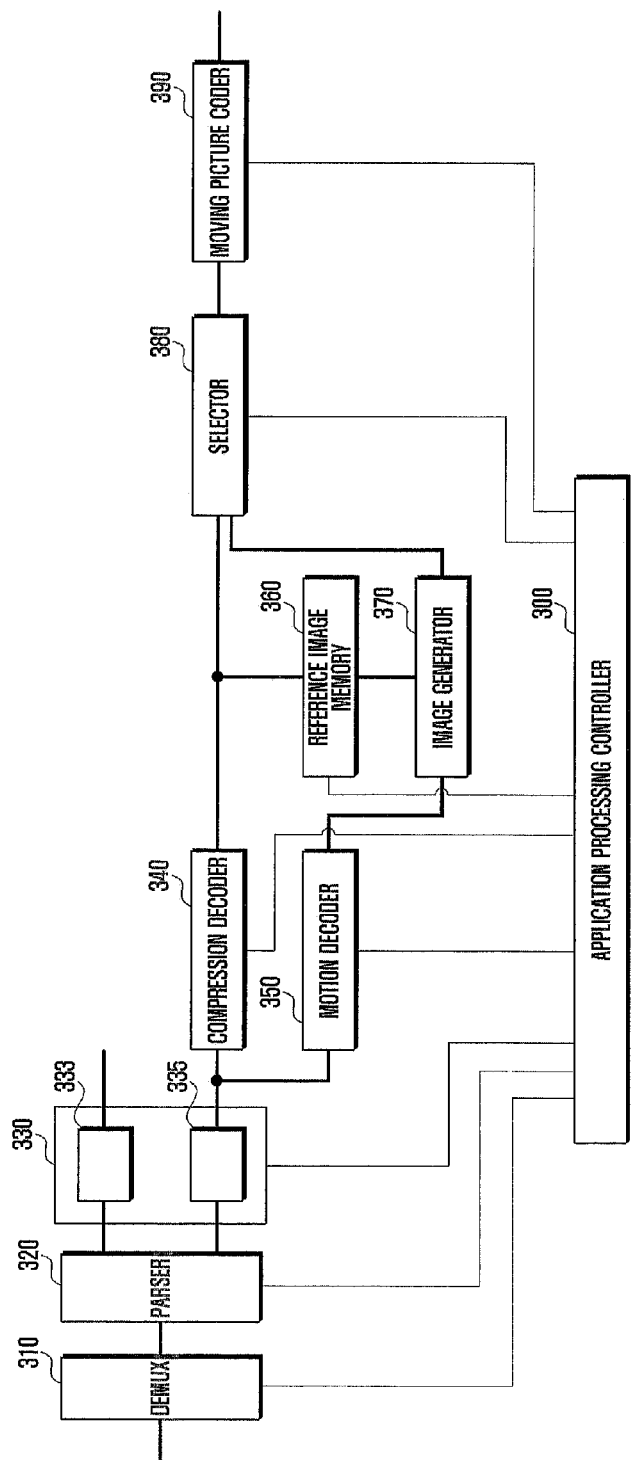
FIG. 3 is a block diagram illustrating a configuration of an application processor according to an embodiment of the present disclosure.

FIG. 3 is a block diagram illustrating a configuration of an application processor according to an embodiment of the present disclosure.

Referring to FIG. 3, the application processing controller 300 controls an operation of the image processor 130 according to a command of the input unit 170, buffers an image output from the image processor, display the image on the display unit 160, and stores the buffered compression image in the storage unit 150 when a capture (still image or moving picture) command occurs. A demultiplexer 310 demultiplexes the display image and the compression image from the image processor 130 and outputs the demultiplexed image under the control of the application processing controller 300. A parser 320 parses the images demultiplexed by the demultiplexer 310 as the display image and the compression image. When the application processing controller 300 controls the demultiplexer 310 to software-parse the display image and the compression image output from the image processor 130, the parser 320 may be omitted. A buffer 330 may include a display image buffer 333 and a compression image buffer 335. The buffer 330 buffers the parsed display image and compression image under the control of the application processing controller 300. The buffer 330 has a size capable of buffering a display image of N frames, and a structure of the buffer 330 may has a ring buffer structure. The reason to configure the buffer 330 by a ring buffer structure is that a received display image and compression image of a frame are maintained at a preset number of frames.

A compression decoder 340 restores the compression image to generate a YIN image of UHD under the control of the application processor 300. A reference image memory 360 stores a YUV image of UHD for every N-th frame output from the compression decoder 340 under the control of the application processing controller 300 as a reference image. A motion decoder 350 decodes motion compression data of remaining frames except for every N-th frame. An image generator 370 inputs the outputs of the reference image memory 360 and the motion decoder 350, and applies the restored motion vector to the reference image to generate a YUV image of UHD. The selector 380 inputs the outputs of the compression decoder 340 and the image generator 370, and selects the output of the compression decoder 340 or the image generator 370 to output a restored image of UHD for each frame under the control of the application processing controller 300. A moving picture coder 390 decodes the YUV image of UHD output from the selector 380 to a moving picture and outputs the moving picture. The moving picture coder 390 may be configured by various moving picture coders such as H.264 or MPEG. It is assumed in the embodiment of the present disclosure that the moving picture coder 390 is an MPEG coder 390.

FIG. 3 illustrates a coder as a configuration for compressing a still image and a moving picture included in the image processor 130 and the application processor 140.

However, in general, a configuration of compressing an image and releasing the compressing is one chip, which is a CODEC (COder & DECcoder). Accordingly, the still image coder (e.g., JPEG coder) may be configured by a still image CODEC (JPEG CODEC). A moving picture coder 390 (e.g., MPEG coder) of the application processor 140 may be a moving picture CODEC (MPEG CODEC). The embodiment of the present disclosure will be described based on an operation of coding images shot from the camera 110 to a moving picture and storing the moving picture.

An operation of compressing and storing a moving picture according to the embodiment of the present disclosure will be described with reference to FIGS. 1 to 3. Hereinafter, it is assumed that the compression coder 230 is a JPEG coder and the motion coder 250 is an RLC coder.

First, the following is an operation of the image processor 130. An image preprocessor 210 converts an image acquired from the camera 110 into YUV data for each frame and outputs the YUV data. In this case, the image may be a YUV image of UHD. The YUV data are provided to a scaler 220, a compression coder 230, a motion detector 240, and a reference image memory 260, respectively. Then, the scaler 220 scales the YUV data for preview to generate a display image. A compression coder 230 of the image processing controller 200 codes a YUV image in a first frame of N frames in periods of N frames to generate a JPEG image. The reference image memory 260 stores a YUV image of a first frame of the N frames as a reference image. The motion detector 240 compares YUV images of remaining frames except for a first frame in periods of N frames with the reference image to detect a motion vector between two frames, and outputs a comparison result to the image processing controller 200. The motion coder 250 RLC-codes a motion vector detected by the motion detector 240.

Then, the image processing controller 200 controls the selector 270 to select the output of the compression coder 230 or the output of the motion coder 250 as a compression image. That is, the image processing controller 200 selects the output of the compression coder 230 during a first frame period and the output of the motion coder 250 during remaining frame periods in periods of N frames. The image processing controller 200 analyzes the output of the motion detector 240 during a frame period selecting the output of the motion coder 250 to determine whether the motion vector is equal to or greater than the specific size. When the motion vector is equal to or greater than the specific size, the image processing controller 200 controls the selector 270 to select the output of the compression coder 230. When the motion vector is less than the specific size, the image processing controller 200 controls the selector 270 to select the output of the motion coder 250.

Accordingly, the image processing controller 200 controls the selector 270 to output a JPEG image (e.g., when it is an N frame or when the motion vector is equal to or greater than the specific size) or a coded motion vector (e.g., when it is not the N frame and when the motion vector is less than the specific size). The multiplexer 280 multiplexes the display image output from the scaler 220 and the compression image output from the selector 270 to one frame and transmits the one frame to the application processor 140.

When the motion vector has the specific size to transmit the JPEG image, the image processing controller 100 stores YUV data corresponding to an image of a corresponding frame in the reference image memory 260, and the motion detector 240 may compare YUV images of next frames with stored reference images to detect a motion vector. That is, when a motion vector of a specific frame is larger than a preset size during an N frame period, an image of a corresponding frame means that a motion component is large. When images of next remaining frames in the corresponding periods of N frames are compared with the reference image (first frame image of N frames), a large motion vector may be detected. A method of storing a YUV image of a frame output as the JPEG image as a reference image and detecting a motion vector of next frames may be used. When the compression image is received as the JPEG image, the application processor 140 stores a YUV image obtained by restoring a corresponding JPEG image as a reference image, and estimates a motion vector of next frames to restore a YUV image.

Second, the following is an operation of the application processor 140. The application processor 140 separates a display image and a compression image of a frame received through the demultiplexer 310 and the parser 320, and the buffer 330 buffers YUV data for preview in the display image buffer 333 and buffers the JPEG image or encoder motion vector in the compression image buffer 335. The display image buffered in the display image buffer 333 is transmitted to the display unit 160 so that the display unit 160 displays the display image. A compression image of a first frame in periods of N frames is restored to a YUV image of UHD by the compression coder 340, and the restored image of the UHD is stored in the reference image memory 360 and is outputted through the selector 380. Remaining frames in the periods of N frames are RLC-coded by the motion coder 350 to generate a motion vector. The image generator 370 restores the motion vector in the reference image to generate a YUV image of UHD in a corresponding frame, and the generated YUV image is outputted through the selector 380.

In this case, the application processing controller 300 analyzes the compression image buffered in the compression image buffer 335. If the buffered compression image is a JPEG image, the application processing controller 300 transfers the buffered compression image to the compression coder 340. If the buffeted compression image is a motion vector, the application processing controller 300 transfers the buffered compression image to the motion coder 340. Accordingly, if the compression image buffered in the compression image buffer 335 is the JPEG image, the application processing controller 300 generates an output selection signal for selecting an output of the compression coder 340. If the compression image buffered in the compression image buffer 335 is the coded motion vector, the application processing controller 300 generates an output selection signal for selecting an output of the image generator 370. Accordingly, the selector 380 selectively outputs the output of the compression coder 340 and the image generator 370. In an embodiment, the image output from the selector 380 may be a YUV image of UHD, and the moving image coder 390 codes the image to a moving picture and stores the moving picture in the storage unit 150.

When transmitting the JPEG image, the image processing controller 100 stores YUV data corresponding to the JPEG image in the reference image memory 160. The motion detector 240 compares YUV images of next frames with store reference images to detect and transmit a motion vector. When the compression image is received as the JPEG image, the application processor 140 stores a YUV image obtained by restoring a corresponding JPEG image as a reference image and estimates a motion vector of next frames to restore the YUV image.

The following is an operation of storing a still image by the image processor 130 and the application processor 140. If the user requests capture of the still image in a preview mode, the image processing controller 200 controls the selector 270 to select an output of the compression coder 230. The YUV image output from the image preprocessor 210 is scaled by the scaler 220 to generate a display image, and is generated as a JPEG image by the compression coder 230. The multiplexer 280 multiplexes the display image and the JPEG image to one frame and outputs the one frame.

The application processor 140 divides an image received by the demultiplexer 310 and the parser 320 into a display image and a JPEG image, and the buffer 330 buffers the divided images. The application processing controller 300 disables operations of the compression coder 340, the motion coder 350, the reference image memory 360, the image generator 370, and the moving picture coder 390. If the user requests capture of a still image in the foregoing state, the application processing controller 300 accesses and stores a compression image corresponding to a frame when the capture is requested among the compression images buffered in the compression image buffer 335 in the storage unit 150. Accordingly, the camera device may capture an image when the user requests to implement zero shutter-lag.

Figure 4:
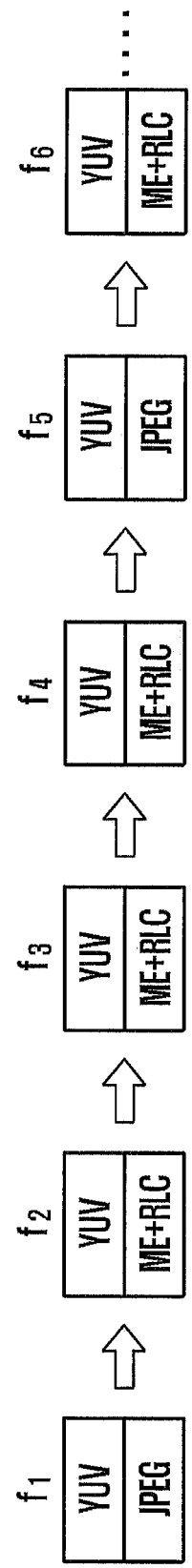
FIG. 4 is a diagram illustrating a method of storing a moving picture by a camera device according to an embodiment of the present disclosure.

FIG. 4 is a diagram illustrating a method of storing a moving picture by a camera device according to an embodiment of the present disclosure. FIG. 4 illustrates an embodiment where N=4. FIG. 4 illustrates that one frame (15 fps) is transmitted as JPEG data in units of four frames in UHD 60 fps reference, and only a motion vector in which three frames (middle frame) are compressed is transmitted. It is understood that a YUV image output from the image preprocessor 210 may be an image of UHD having 8M and the image processor 130 transmits a display image and a compression image of UHD for storage to the application processor 140.

The image processor 130 stores a YUV image in a first frame in periods of four frames as a reference image, converts the YUV image into a JPEG image, and outputs the JPEG image. The image processor 130 compares a YUV image of remaining frames (second, third, and four frames in a period of four frames) to detect a motion estimation motion vector, and RLC-codes the motion estimation motion vector to generate a coded motion vector. For a general moving picture, there is small motion or no motion between frame images in a majority image. Accordingly, the frame image may be processed by only small motion. Accordingly, the data size of the frame image is significantly smaller than that of the JPEG image. To record a maximum compression rate, a P frame and a B frame of an MPEG compression scheme are applicable. However, one embodiment uses only a compression scheme applicable to the image processor 130 among the MPEG compression algorithm. In this embodiment, if the compared data is significantly small, motion estimation (ME) is performed, and then data obtained by RLC-coding the result is transmitted as a compression image of a corresponding frame.

Then, when the transmitted compression image is a JPEG image, the application processor 140 decodes the JPEG image to generate a YUV1 8M data and stores a corresponding JPEG image in the reference image memory 360. The reference image memory 360 may be configured by a circular queue. If the image transmitted from the image processor 130 is a motion vector in which an image is coded (ME+RLC data), the application processor 140 decodes the motion vector, stores the decoded motion vector, and compares the motion vector with YUV data of a reference image to generate a new YUV image (that is, YUV image of corresponding frame). The foregoing YUV data may be a YUV image of UHD, and are restored in an order of frames and are supplied to the moving picture coder 390 so that the YUV data are compression-coded to a moving picture and the moving picture is stored in the storage unit 150. In FIG. 4, when a moving picture is shot at a rate of 15 fps upon a request of moving picture shooting, an operation of detecting a motion vector is not performed but a compression image is generated and processed as a JPEG image so that an operation of coding the moving picture may be performed. That is, FIG. 4 illustrates that a JPEG image is generated at a rate of 15 fps when shooting the moving picture. Accordingly, when shooting the moving picture at a rate of 15 fps, an operation of detecting the motion vector may be not performed. However, when shooting the moving picture at a rate of 60 fps, as shown in FIG. 4, a first frame image $f_1$ based on 4 frames is generated as the JPEG image and remaining frames $f_2$, $f_3$, $f_4$ are generated as a coded motion vector. Accordingly, when the motion vector is equal to or greater than a preset size, as described above, an image of a corresponding frame may be outputted as the JPEG image.

As described above, when shooting and storing a moving picture of UHD, an image of a first frame in periods of N frames is stored as a reference image and is compressed and outputted as a JPEG image, and images of remaining frames output only a motion vector of a reference image, so that a transmission amount of data may be significantly reduced and accordingly an image of UHD may be stored as a moving picture.

Figure 5:
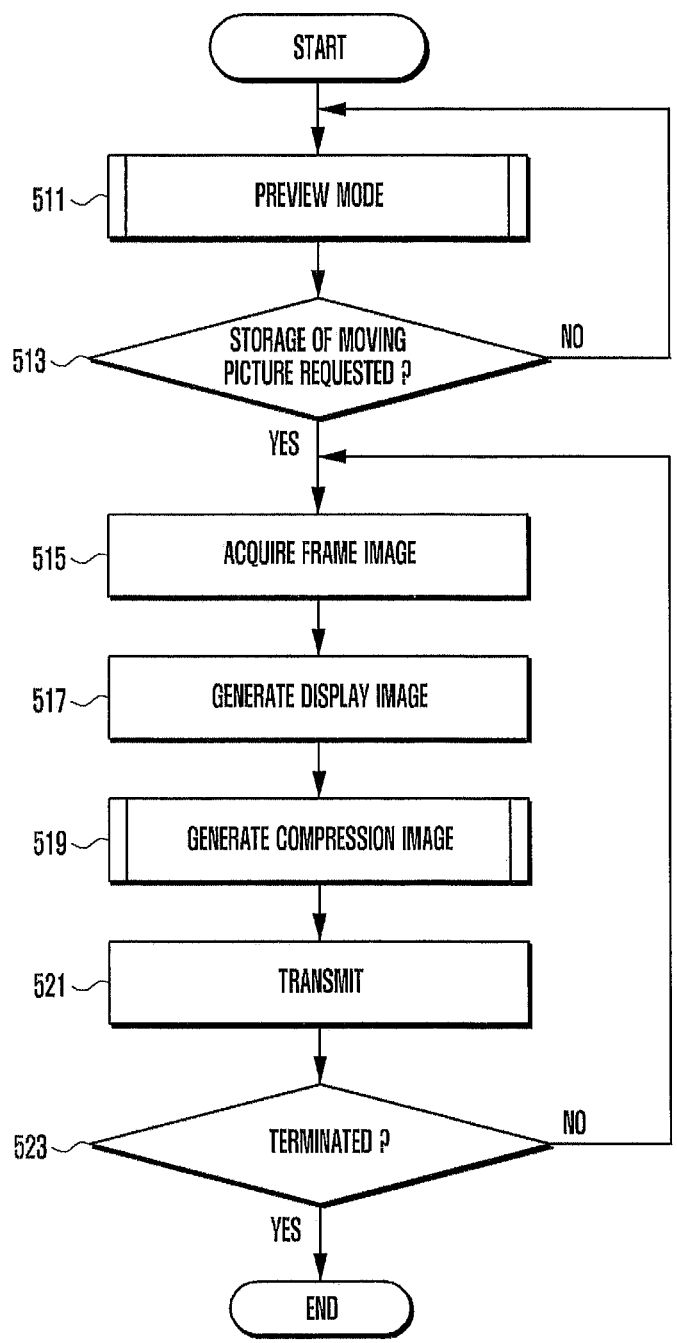
FIG. 5 is a flowchart illustrating an operation of the camera device when an image processor shoots the moving picture according to an embodiment of the present disclosure.

FIG. 5 is a flowchart illustrating an operation of the camera device when an image processor 130 shoots the moving picture according to an embodiment of the present disclosure.

Referring to FIG. 5, if a camera operation request is inputted from an input unit 170, an application processor 140 detects and informs the input camera operation request and the image processor 130 operates a camera 110. The image processor 130 operates the camera 110 according to preset information (e.g., focus, zoom, white balance, and the like). If the camera 110 is operated, the camera 110 shoots images of UHD, and the image processor 130 and the application processor 140 perform a preview mode (block 511). The image processor 130 acquires an image for each frame and generates a display image and a compression image in a corresponding frame. In an embodiment, a frame rate may be 30 fps or greater (e.g., 60 fps).

The generated display image and compression image are multiplexed and the multiplexed image is transferred to the application processor 140, the application processor 140 buffers the display image and the compression image, and the display image is displayed on the display unit 160 as a preview image. As illustrated above, when the user commands moving picture shooting in a state of performing the preview mode (block 513), the image processor 130 acquires an image for each frame (block 515), generates the acquired image as a display image (block 517), and generates the acquired image as a compression image (block 519). In an embodiment, the compression is an image for storage, which may be a compression image of a still image or a compression image of a motion vector.

The image processor 130 generates a compression image of a still image in a first frame in periods of N frames, and generates motion vectors of the still image and a corresponding frame image in remaining frames in the periods of N frames (block 519). Next, the image processor 130 multiplexes the display image and the compression image to one frame, and transmits the one frame to the application processor 140 (block 521). The foregoing operation is repeatedly performed until moving picture shooting is terminated. When the moving picture shooting is terminated, the image processor 130 detects the terminated moving picture shooting (block 523) and terminates an image processing operation for moving picture shooting.

Figure 6:
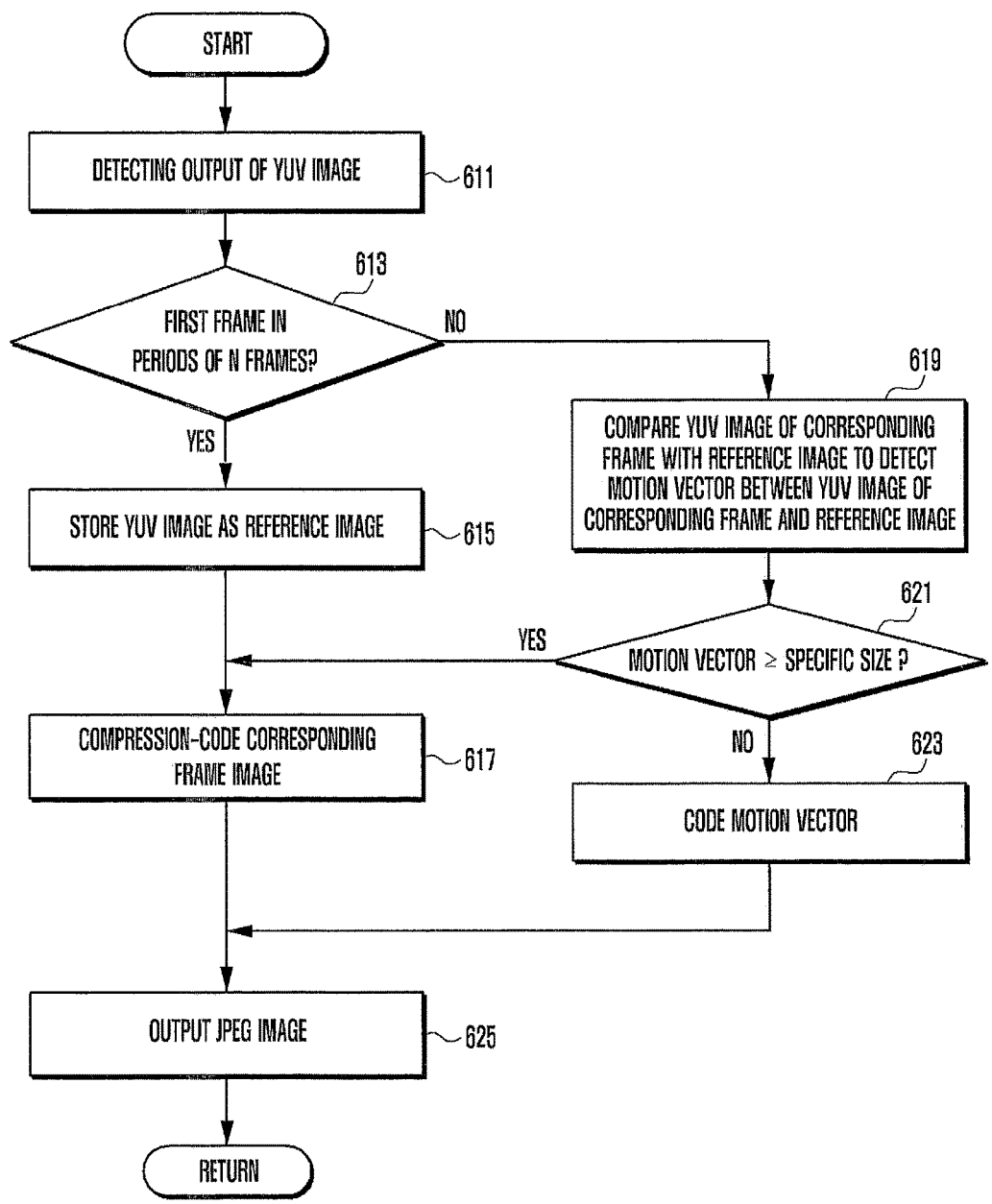
FIG. 6 is a flowchart illustrating a method of generating a compression image according to an embodiment of the present disclosure shown in FIG. 5.

FIG. 6 is a flowchart illustrating a method of generating a compression image according to an embodiment of the present disclosure shown in FIG. 5.

Referring to FIG. 6, when detecting an output of a YUV image of UHD from an image preprocessor 210 (block 611), an image processing controller 200 determines whether a corresponding YUV image is a first frame in periods of N frames (block 613). When the corresponding YUV image is the first frame in periods of N frames, the image processing controller 200 detects the YUV image (block 613) and stores the YUV image in a reference image memory 260 as a reference image (block 615), a compression coder 230 compression-codes the corresponding frame image to generate a JPEG image (block 617), and the image processing controller 200 controls a selector 270 to output the JPEG image (block 625).

Alternatively, if the corresponding YUV image is not the first frame in periods of N frames, the image processing controller 200 compares a YUV image of a corresponding frame with the reference image to detect a motion vector between the YUV image of the corresponding frame and the reference image (block 619), RLC-codes the detected motion vector (block 623), and controls the selector 270 to output the detected motion vector (block 625).

In an embodiment, it may be preferable to compress a still image instead of using the motion vector when the detected motion vector is equal to or greater than a specific size. Accordingly, the image processing controller 200 analyzes the motion vector from the motion detector 240 and determines whether the motion vector is equal to or greater than the specific size (block 621). When the motion vector is equal to or greater than the specific size, the image processing controller 200 selectively outputs the output of the compression coder 230 as a compression image of a corresponding frame (block 617). When the motion vector is less than the specific size, the image processing controller 200 coders the motion vector (block 623) and may selectively output the motion vector as the compression image. A multiplexer 280 multiplexes the compression image of the still image and a compression image obtained by coding the motion vector and the display image to one frame and transmits the one frame to the application processor 140.

Figure 7:
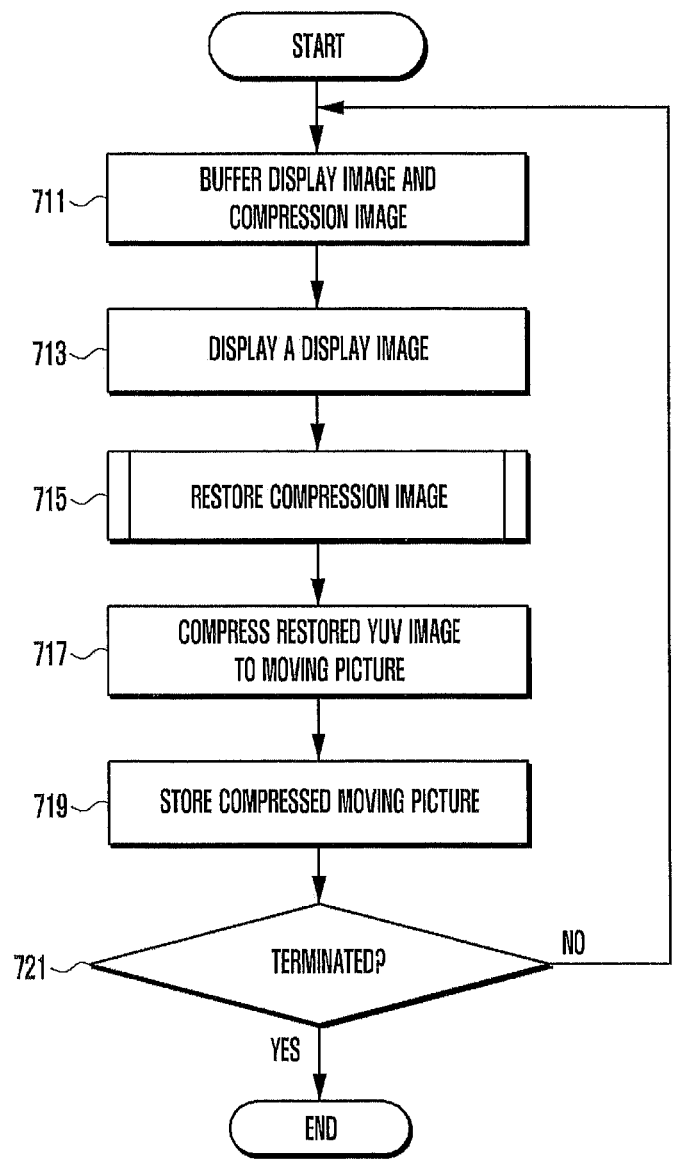
FIG. 7 is a flowchart illustrating a method of shooting a moving picture by an application processor according to an embodiment of the present disclosure.

FIG. 7 is a flowchart illustrating a method of shooting a moving picture by an application processor according to an embodiment of the present disclosure.

Referring to FIG. 7, a demultiplexer 310 demultiplexes the multiplexed frame images from the multiplexer 280, a parser 320 parses the demultiplexed frame images to a display image and a compression image, and a display image buffer 333 and a compression image buffer 335 of the buffer 330 buffers the display image and the compression image from the parser 320, respectively (block 711). Then, the application processing controller 300 outputs the buffered display image to the display unit 160 such that the display unit 160 displays the buffered display image (block 713).

Next, the application processing controller 300 restores the compression image to restore a YUV image (block 715). If the compression image is a compression image of a still image, the application processing controller 300 restores the compression through a compression coder 340. If the compression image is a compression image of a coded motion vector, the application processing controller 300 restores the motion vector and applies the restored motion vector to restore a YUV image of a corresponding frame. After that, the application processing controller 300 compresses the restored YUV image to a moving picture through a moving picture coder 390 (block 717), and stores the compressed moving picture in the storage unit 150 (block 719). The foregoing operation is repeatedly performed until moving picture shooting is terminated. When the moving picture shooting is terminated, the application processing controller 300 detects the terminated moving picture shooting (block 721) and terminates an image processing operation for moving picture shooting.

Figure 8:
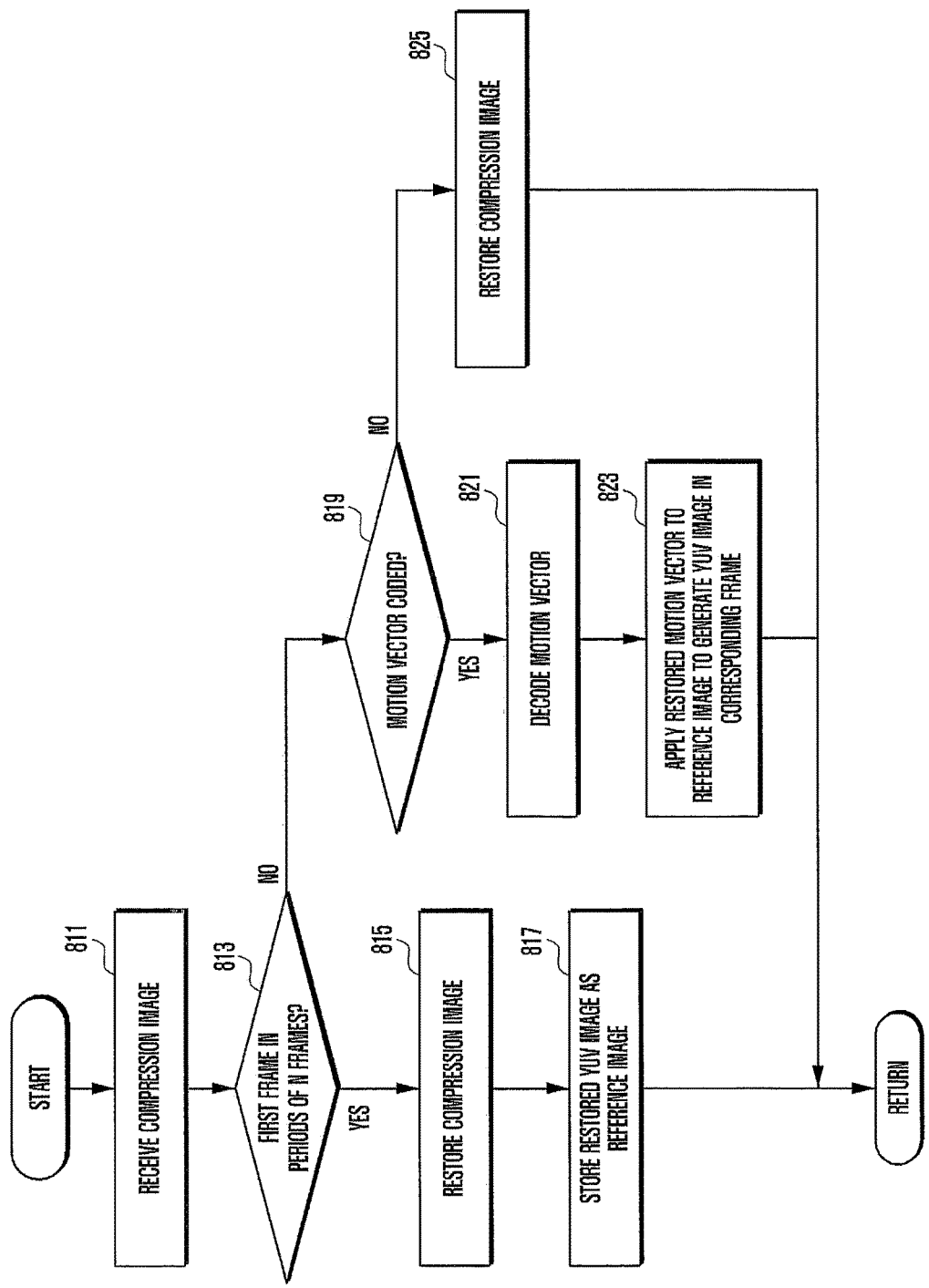
FIG. 8 is a flowchart illustrating a method of restoring and storing a compression image according to an embodiment of the present disclosure.

FIG. 8 is a flowchart illustrating a method of restoring and storing a compression image according to an embodiment of the present disclosure.

Referring to FIG. 8, when a compression image is received (block 811), the application processing controller 300 determines whether a corresponding compression image is a compression image of a first frame in periods of N frames (block 813). If the corresponding compression image is the compression image of a first frame in periods of N frames, the application processing controller 300 restores the compression image to a YUV image through a compression coder 340 (block 815), transfers the restored YUV image to a moving picture coder 390 through a selector 380 (block 817), and stores the restored YUV image as a reference image in a reference image memory 360 (block 817).

Alternatively, if the corresponding compression image is not the compression image of a first frame in periods of N frames at block 813, the application processing controller 300 decodes the coded motion vector to restore the motion vector through a motion decoder 350 (block 821), and applies the restored motion vector to the reference image to generate a YUV image in a corresponding frame through an image generator 370 (block 823).

When the motion vector is equal to or greater than the specific size, the image processor 130 may output a compression image of a corresponding frame as a JPEG image. Accordingly, in this case, the JPEG image may be received in frames other than the first frame in the periods of N frames. When the compression image is not a compression obtained by coding a motion vector (block 819), the application processing controller 300 restores the JPEG image to a YUV image through the compression coder 340 (block 825).

When a motion vector detected from the frame other than the first frame in the periods of N frames has a value greater than the specific size so the JPEG image is transmitted, the image processor 130 may store YUV data corresponding to an image of a corresponding frame as a reference image, and compare YUV images of next frames with stored reference images to detect a motion vector. When the compression image is received as the JPEG image, the application processor 140 stores a YUV image restoring a corresponding JPEG image as the reference image and estimates motion vectors of next frames to restore a YUV image.

Figure 9:
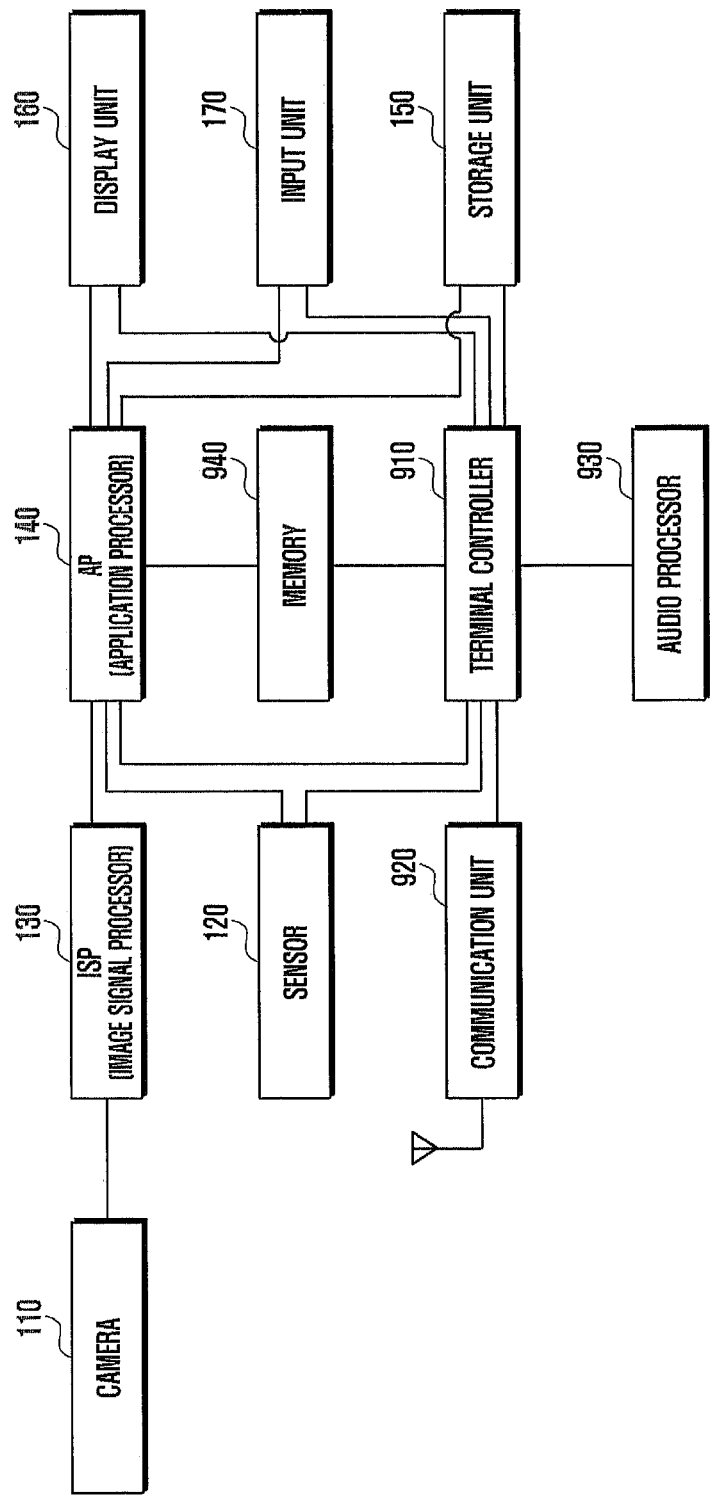
FIG. 9 is a block diagram illustrating a configuration of a portable terminal apparatus including a camera device according to an embodiment of the present disclosure.

FIG. 9 is a block diagram illustrating a configuration of a portable terminal apparatus including a camera device according to an embodiment of the present disclosure.

Referring to FIG. 9, a camera 110 includes a sensor 120, and performs a function of acquiring an image through the sensor upon operation of the camera. The sensor 120 may be at least one sensor which is mounted in the portable terminal apparatus, and includes at least one of a GPS receiver, a gyro sensor, an acceleration sensor, an altitude sensor, and a direction sensor. The image processor 130 processes an image acquired from the camera 110 to generate a display image to be displayed on a display unit 160 for each frame and a compression image to be stored upon capture request (still image and moving picture shooting). The display image may be a YUV image and the compression image may be a JPEG image.

If moving picture shooting is requested, to transfer images of UHD to the application processor 140, the image processor 130 generates a compression image compression-coding the still image in a first frame in periods of N frames, and detects a motion vector between the image of the first frame and a corresponding frame in remaining frames, and codes the detected motion vector to generate a compression image. The image processor 130 may generate a display image, a compression image, and shooting information at a frame rate of 30 frames per second or greater (e.g., 60 fps).

The application processor 140 performs various functions of the portable terminal apparatus. The application processor 140 may input the output of the sensor 120 and process various sensor applications according to a user request. For example, the application processor 140 may input the output of GPS reception to process a navigation function and an application detecting regional information according to a location of a terminal, and execute an application of executing a preset function in a currently executed application according to motion of the terminal apparatus. In an embodiment, the application processor 140 buffers a display image and a compression image generated for each frame by the image processor 130 and controls the display unit 160 to display the display image upon operation of a camera according to the embodiment of the present disclosure.

If a capture request command of the still image occurs, the application processor 140 stores a preset compression image of the buffered compression images among the buffered compression images in the storage unit 150 to implement a zero shutter-lag. If the moving picture shooting command occurs, the application processor 140 decodes the compression image with respect to a still image in a first frame in periods of N frames to restore a YUV image, and applies a received motion vector to the restored YUV image of the first frame to generate YUV images in a corresponding frame. Next, the application processor 140 compression-codes the restored YUV images to a moving picture and stores the moving picture in the storage unit 150.

A communication unit 920 performs a communication function with an external device or a base station. The communication unit 920 may include a frequency up converter up-converting a transmitted signal to an RF band, an amplifier noise-amplifying an RF received signal, and a frequency down converter down-converting an RF signal to a baseband. The communication unit 920 may include a modulator modulating the transmitted signal and transferring the modulated signal to a transmitter and a demodulator demodulating a signal output from a receiver. The modulator and the demodulator may include a modulator and a demodulator of a WCDMA, GSM, LTE, WIFI, or WIBRO scheme.

A terminal controller 910 controls an overall operation of the portable terminal apparatus, and performs voice call and data communication functions. The terminal controller 910 may include a modulator and a demodulator of the communication unit 920. In this case, the communication unit 920 may include only an RF communication unit. In this case, the terminal controller 910 may perform a function of modulating/demodulating and coding/decoding the communication signal.

The audio processor 930 may be connected to a handset of the portable terminal apparatus and processes a call voice during voice communication under the control of the terminal controller 910. The memory 940 may be a work memory in which programs of the terminal controller 910 and the application processor 140 are loaded. In this case, the memory 940 may be configured as a RAM.

The input unit 170 generates and provides various operation commands and data input signals of the portable terminal apparatus to the terminal controller 910 and the application processor 140. Particularly, the input unit 170 may generates and provides a camera operation command and a capture command to the application processor 140. The input unit 170 may generate a command requesting display of shooting information and/or thumbnail images according to a user request upon capture of the image. The display unit 160 displays an operation of the portable terminal apparatus and an application execution state under the control of the terminal controller 910 and the application processor 140. Particularly, the display unit 160 displays a display image output from the application processor 140 in a preview mode according to the embodiment of the present disclosure. The display unit 160 may display shooting information and/or thumbnail images output from the application processor 140. The input unit 170 may include a touch panel for detecting a touch input of the user. The display unit 160 may include an LCD or OLED panel for displaying data and images generated during execution of a program. The input unit 170 and the display unit 160 may be an integral touch screen. The input unit 170 may include buttons located outside the camera device.

The storage unit 150 may include a program memory storing an operation program of the portable terminal apparatus and programs according to the embodiment of the present disclosure, and a data memory storing data for executing a program and data generated during execution of the program. In an embodiment, the storage unit 150 may be configured by a non-volatile memory such as a flash memory. Particularly, the storage unit 150 stores a buffered compression image in the application processor 140 upon a capture request according to the embodiment of the present disclosure.

A portable terminal apparatus having a configuration as illustrated in FIG. 9 may perform incoming/outgoing call and communication services, and process an image shot by the camera 110 in a camera shooting mode according to the embodiment of the present disclosure. When starting a portable terminal according to power on of the portable terminal, the terminal controller 910 loads a call and communication in the storage unit 150 and operation programs of the portable terminal apparatus to the memory 940. When execution of the application is requested, the application processor 140 loads a program for controlling corresponding applications stored in the storage unit 150 to the memory 940. Accordingly, upon start of a system, the memory 940 performs a work memory function in which operation programs of the portable terminal apparatus and application programs are loaded. The application processor 140 may share the memory 940 with the terminal controller 910, and the memory 940 may be independently configured and used.

The application processor 140 processes an image processing application of a camera 110 and various applications of the portable terminal apparatus. To process the foregoing various applications, the application processor 140 may input the output of the sensor 120. The application processor 140 may execute an application using an output of the sensor 120 or control a processing operation of an application according to the output of the sensor 120. The terminal controller 910 may input the output of the sensor 120, and perform a call or communication service or control the call or communication service according to the output of the sensor 120.

Upon an outgoing call, the user may generate an outgoing phone number and a call request signal. The terminal controller 910 having detected the outgoing phone number and call request signal controls the communication unit 920 to form a call path, and performs an outgoing call function through a base station. If an incoming call is generated, the terminal controller 910 detects the generated incoming call, and generates an incoming alarm through the audio processor 930, and displays incoming information through the display unit 160. If the user responds through the input unit 170, the terminal controller 910 forms an incoming call path through the communication unit 920 to perform a call service. Data communication forms a communication path by an operation similar to the call communication.

The portable terminal apparatus may execute various applications. If the user requests execution of a specific application through the input unit 170, the application processor 140 executes a corresponding application and displays the executed result on the display unit 160. If the user generates a camera operation request command, the application processor detects the generated camera operation request command and operates the camera 110 through the image processor 130. Then, the image processor 130 processes an image shot by the camera 110 for each frame to generate a display image and a compression image. Then, the application processor 140 buffers a display image and a compression image generated and received for each frame and displays the display image on the display unit 160 as a preview image.

If the user generates a moving picture capture command through the input unit 170, as described above, to transmit the YUV image of UHD to the application processor 140, the image processor 130 detects a compression image compression-coding the still image to a JPEG image and a motion vector between a still image of a specific frame and a corresponding frame image, and generates a motion vector obtained by RLC-coding the motion vector as a compression image. A frame coding the still image to a JPEG image may be a first frame in units of N frames, and in remaining frames, a motion vector between a first frame image and a corresponding frame image and data obtained by RLC-coding the motion vector is used as a compression image. Accordingly, an amount of data to be transmitted when acquired compression-coding frame images may be significantly reduced so that the image processor 130 may transfer an image of UHD to the application processor 140.

Accordingly, the application processor 140 may restore a compression image of a first frame in periods of N frames as a still image and images of remaining frames using the restored image and a motion vector of a corresponding frame as an original frame. As described above, the application processor 140 may again compress the restored images and store the compressed images in the storage unit 150. The application processor 140 may store the image of UHD shot from the camera 110 as a moving picture.

In the camera device or a terminal apparatus including a camera according to the present disclosure, the image processor compares an image of UHD acquired from the camera with an image of UHD of an adjacent frame and compression-codes and transmits the comparison result. The application processor restores and codes the compression-coded images to a moving picture image and stores the moving picture image. Accordingly, the image processor transmits the image of UHD to the application processor so that image of HUD acquired from the camera can be stored as a moving picture.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of image processing of a portable terminal comprising:
   acquiring a frame image for each frame from a camera upon shooting a moving picture;
   dividing and generating each of the acquired frame images into a display image and a compression image, and configuring each of the compression images as a motion vector of a respective frame corresponding to a reference frame image or a compression image of the reference frame image;
   multiplexing the display image and the compression image into a single transfer frame for each of the frames;
   displaying the display image and restoring and compressing the compression image to the moving picture; and
   storing a compressed moving picture,
   wherein generating the compression image comprises:
      generating a first image of a specific frame in units of N frames as a first compression image of a first still image when acquiring the frame image;
      detecting images of remaining frames of the N frames and the first image of the specific frame and generating each of the motion vectors as a remaining compression image; and
      selecting the compression images according to an order of frames, and
   wherein the specific frame is a first frame of the units of the N frames, and
   wherein generating each of the motion vectors as the remaining compression images comprises:
      storing the first still image of the first frame as a reference image;
      detecting a motion vector for each of the remaining frames comparing each of the remaining frame images and the reference image;
      compression-coding the detected motion vector to generate the compression image, and
   wherein the method further comprising:
      comparing each of the detected motion vectors with a preset size after detecting the motion vector; and
      generating, a second still image as the compression image when one of the detected motion vectors is larger than the preset size.

2. The method of claim 1, further comprising storing the second still image of a corresponding frame as a second reference image when the second still image is generated as the compression image.

3. The method of claim 1, wherein restoring the compression image comprises:
   decoding the first compression image to generate the first still image when a received compression image is the first image of the specific frame in the units of the N frames, and
   applying the motion vector to the decoded first still image to generate an image of the respective frame when the received compression image is not the first image of the specific frame; and
   compression-coding the generated frame images to the moving picture in the order of frames.

4. The method of claim 3, wherein applying the motion vector to the decoded first still image to generate an image of the respective frame comprises:
   storing the decoded first still image of the first frame as a first decoded reference image;
   decoding a compression-coded motion vector of the respective frame; and
   applying the decoded motion vector to the first decoded reference image to generate a decoded image of the respective frame.

5. The method of claim 4, further comprising decoding the compression image to the first still image when the compression image of the respective frame is a compression image of the first still image and the compression image of the respective frame is not the first frame in the units of N frames.

6. A camera device comprising: a camera; an image signal processor (ISP) configured to: acquire a frame image for each frame from the camera upon shooting a moving picture, divide each of the acquired images into a display image and a compression image, and configure each of the compression images as a motion vector of a respective frame corresponding to a reference frame image or a compression image of the reference frame image; a multiplexer configured to multiplex the compression image and the display image into a single transmit frame for each of the frames; an application processor (AP) configured to control a display to display the display image, and restore and compress the compression image to the moving picture; a memory configured to store the compressed moving picture; and the display configured to display the display image, wherein the ISP comprises: a coder configured to code a first image of a specific frame in units of N frames as a first compression image of a first still image when acquiring the frame image, a motion detector configured to detect images of remaining frames of the N frames and the first image of the specific frame to generate a remaining compression image, a selector configured to select the compression images according to an order of frames, a reference image memory configured to store the first still image of a first frame as a reference image, and a motion coder configured to compression-code an output of a motion detector detecting a motion vector for each of the remaining frames comparing each of the remaining frame images and the reference image to generate the compression image; wherein the ISP is further configured to: compare each of the detected motion vectors with a preset size after detecting the motion vector; and generate, a second still image as the compression image when one of the detected motion vectors is larger than the preset size; wherein the specific frame is the first frame of the units of the N frames.

7. The camera device of claim 6, wherein the AP comprises:
a compression decoder configured to decode the first compression image to generate the first still image when a received compression image is the first image of the specific frame in the units of the N frames;
an image generator configured to apply the motion vector to the decoded first still image to generate an image of the respective frame when the received compression image is not the first image of the specific frame;
a selector configured to select the frame images according to an order of frames; and
a moving picture coder configured to compression-code the selected frame images to the moving picture.

8. The camera device of claim 7, wherein the AP comprises: a reference image memory configured to store the decoded first still image of the first frame as a first decoded reference image; and a motion decoder configured to decode a compression-coded motion vector of the respective frame, wherein the image generator is configured to apply the decoded motion vector to the first decoded reference image to generate a decoded image of the respective frame.

9. A portable terminal apparatus comprising: a communication unit configured to perform wireless communication with an external device; a terminal controller configured to control a call and communication of the portable terminal apparatus through the communication unit; a camera configured to acquire an image from a camera sensor for each frame upon operation of the camera; an image signal processor (ISP) configured to: acquire a frame image for each frame from the camera upon shooting a moving picture, divide each of the acquired images into a display image and a compression image to transmit one frame, and configure each of the compression images as a motion vector of a frame corresponding to a reference frame image or a compression image of the reference frame image; a multiplexer configured to multiplex the compression image and the display images into a single transmit frame for each of the frames; an application processor (AP) configured to control a display unit to display the display image and restore and compress the compression image to the moving picture; a memory configured to store a compressed moving picture; and the display unit configured to display the display image, wherein the ISP comprises: a coder configured to code a first image of a specific frame in units of N frames as a first compression image of a first still image when acquiring the frame image, a motion detector configured to detect images of remaining frames of the N frames and the first image of the specific frame to generate a remaining compression image, a selector configured to select the compression images according to an order of frames, a reference image memory configured to store the first still image of a first frame as a reference image, and a motion coder configured to compression-code an output of a motion detector detecting a motion vector for each of the remaining frames comparing each of the remaining frame images and the reference image to generate the compression image; wherein the ISP is further configured to: compare each of the detected motion vectors with a preset size after detecting the motion vector; and generate, a second still image as the compression image when one of the detected motion vectors is larger than the preset size; wherein the specific frame is the first frame of the units of the N frames.

10. The portable terminal apparatus of claim 9, wherein the AP comprises:
a compression decoder configured to decode the first compression image to generate the first still image when a received compression image is the first image of the specific frame in the units of the N frames;
an image generator configured to apply the motion vector to the decoded first still image to generate an image of the respective frame when the received compression image is not the first image of the specific frame;
a selector configured to select the frame images according to an order of frames; and
a moving picture coder configured to compression-code the selected frame images to the moving picture.

* * * * *